United States Patent [19]
Mukai et al.

[11] Patent Number: 5,010,287
[45] Date of Patent: Apr. 23, 1991

[54] INDUCTION MOTOR CONTROL SYSTEM

[75] Inventors: Tadayoshi Mukai, Izumi-Otsu; Akira Yoshino, Seto, both of Japan

[73] Assignee: Matsushita Electric Works, Ltd., Osaka, Japan

[21] Appl. No.: 313,461

[22] Filed: Feb. 22, 1989

[30] Foreign Application Priority Data

Feb. 24, 1988 [JP] Japan .................. 63-40997

[51] Int. Cl.⁵ .............................................. H02P 5/34
[52] U.S. Cl. ..................... 318/801; 318/729; 318/810; 388/812; 388/815; 388/904
[58] Field of Search ............... 318/798–803, 318/805, 806, 807–811, 729; 398/802, 805–806, 809–810, 912–815, 905, 908, 911

[56] References Cited

U.S. PATENT DOCUMENTS

| | | | |
|---|---|---|---|
| 3,718,851 | 8/1971 | Graf et al. ............. | 318/806 X |
| 3,909,687 | 9/1975 | Abbondanti ........... | 318/227 |
| 4,249,120 | 2/1981 | Earle ..................... | 318/808 X |
| 4,695,783 | 9/1987 | Shero et al. ........... | 318/808 |
| 4,736,148 | 4/1988 | Hirata ................... | 318/803 X |

FOREIGN PATENT DOCUMENTS 59-92800 5/1984 Japan .
WO8706403 10/1987 World Int. Prop. O. .

*Primary Examiner*—William M. Shoop, Jr.
*Assistant Examiner*—David Martin
*Attorney, Agent, or Firm*—Stevens, Davis, Miller & Mosher

[57] ABSTRACT

An improved induction motor control system utilizes an inverter supplying a variable frequency AC voltage to drive the induction motor, and volt/frequency (V/F) control section controlling the inverter to produce a suitable voltage and frequency in a predetermined relationship therebetween. A power factor detecting section is included to detect a power factor phase angle between the motor current and the inverter output voltage as indicative of an amount of load imposed on the motor. The detected power factor phase angle is compared with a predetermined phase angle which is a frequency dependent angle indicative of a standard load at a given frequency, in order to provide a control output in response to which the V/F control section alters the inverter output voltage out of the predetermined relationship with the frequency for improving motor efficiency. Thus, the detected load (i.e., power factor phase angle) can be evaluated, by simple comparison with the standard load level (reference angle), for controlling the inverter to effect the output voltage or motor torque regulation in response to the load imposed. Also, the frequency dependent reference angle can well compensate for a significant phase shifting of the motor current in relation to the inverter output voltage as seen in the low frequency range, enabling a consistent motor control even in the lower frequency range.

8 Claims, 6 Drawing Sheets

INDUCTION MOTOR CONTROL SYSTEM

BACKGROUND OF THE INVENTION

1. Field of the Invention

The present invention is directed to an induction motor control system, and more particularly to an improved control system for controlling a variable speed induction motor on a constant volt/frequency basis.

2. Description of the Prior Art

Control systems for a variable speed induction motor are known in the art to include a vector control, slip-frequency control, and a constant volt/frequency control. These control systems utilize an inverter supplying a variable frequency AC voltage to the induction motor but differ in a manner of controlling the inverter. The constant volt/frequency control is devised to keep a motor flux constant by regulating the output voltage of the inverter in relation to a frequency in order to drive the motor efficiently, and therefor has been widely utilized among the other control systems for general application purposes by the reason that it requires no additional tachogenerataor essential in the slip-frequency control or no complicated operations inherent to the vector control.

However, at low frequency, the constant volt/frequency control technique suffers from a considerable torque drop due to a significant stator resistive drop, i.e., the reduction of the motor flux. That is, with a constant volt/frequency control it is practically impossible to regulate the torque in the low frequency range and therefore to handle a load which requires a great starting torque. To overcome the problem, the prior art has proposed a scheme of compensating for the stator resistive drop in order to obtain a constant induced air gap voltage per frequency rather than a constant inverter output voltage per frequency in the low frequency range. This scheme utilizes a predetermined volt/frequency relation or volt/frequency (V/F) curve arranged to compensate for the significant stator resistive drop at the low frequency. Such V/F curve is assigned to and effective for a specific load requirement, therefore the scheme further requires to use a number of V/F curves for different power or load requirements so that a suitable V/F curve can be selected in accordance with the torque pattern or load requirement already known to an intended work. As described, such prior art scheme is found to be effective only for a limited application where the torque pattern of a load is known, thus failing to provide a general purpose motor control system. In addition, the above prior scheme is found inconvenient in that the selection of V/F curves have to be done by an user.

To eliminate the above insufficiency, Japanese Patent Publication (KOKAI) No. 61-81197 has suggested an automatic selection of V/F curve in response to the load imposed on the motor. This patent teaches to derive the amplitude of the motor current at an angle of 90° of the inverter output voltage and to utilize such amplitude of the motor current as an index of the load imposed in controlling the inverter. That is, the system monitors the amount of the motor current at a particular angle to indicative of the instantaneous load and selects a suitable V/F curve prepared for such load in a proportional control basis. Although the system enables an automatic selection of V/F curve or motor torque regulation with varying loads, the above proportional control requires a rather complicated analog circuit which is hindrance to reducing the manufacturing cost of the control system. In addition, the control system is found not to operate reliably at the low frequency. The unreliability comes from that the above index of the load becomes no longer reflect a correct load as the stator resistance will act again to disorder the phase relation between the motor current and the inverter output voltage to a serious extent at the low frequency. For instance, under no load condition, the phase angle between the motor current and the inverter output voltage becomes considerably less than 90° due to the stator resistance remarkable at the low frequency, while the phase angle is kept about at slightly less than 90° at the high frequency. Such serious variation of the phase angle at the low frequency will eventually results in the variation in the detected amount of the motor control and therefore leads to an unreliable or erroneous motor control. That is, even under no load condition, the system will detect a significant amplitude of the motor current at 90° angle of the inverter output voltage and acknowledge a correspondingly amount of load being imposed, thereby controlling the inverter based upon such false detection to increase the output voltage in an attempt to follow the false load. The result is that the motor is overheated or driven with unacceptable high noise level.

SUMMARY OF THE INVENTION

The present invention eliminates the above problem and insufficiency and provides an improved control system for a variable frequency induction motor based upon a constant volt/frequency control. The motor control system in accordance with the present invention utilizes an inverter supplying a variable frequency AC voltage to drive the induction motor, and volt/frequency control means controlling the inverter to produce a suitable voltage and frequency in a predetermined relationship therebetween. Means is included to detect a power factor phase angle between the motor current and the inverter output voltage as indicative of an amount of load imposed on the motor. The detected power factor phase angle is compared with a predetermined phase angle which is a frequency dependent angle indicative of a standard load at a given frequency, in order to provide a control output. In response to the control output, the volt/frequency control section alters the inverter output voltage out of the predetermined relationship with the frequency for improving motor efficiency. With the use of the reference angle (i.e., standard load level), the power factor phase angle (i.e., detected load level) can be evaluated, by simple comparison with the reference angle as to whether it requires the inverter voltage or motor torque regulation for the instantaneous load imposed. This eliminates the use of a complicated analog circuit as seen in the prior system of a proportional control type for regulating the inverter output voltage in response to the load, and makes it possible to use a simple digital circuitry for automatic inverter voltage control or motor torque regulation, thereby successfully simplifying the circuitry and consequently reducing the manufacturing cost of the automatic motor control system. Moreover, the frequency dependent reference angle can well compensate for the significant phase shifting of the motor current in relation to the inverter output voltage as seen in the low frequency range to thereby obtain a correct index of the load imposed by comparison with the detected power factor phase angle, enabling a consistent motor control even in the lower frequency range and therefore avoiding the overheating of the motor under a no load condition.

Accordingly, it is a primary object of the present invention to provide an improved motor control system which is capable of simplifying the circuitry and reducing the cost of the motor control system, yet assuring an automatic regulation of the inverter output voltage or motor torque correctly and reliably in response to the load requirements over the variable frequency control range of the induction motor.

For providing a consistent compensation for the phase shifting of the motor current at the low frequency, the reference angle is defined to decrease with decreasing frequency in the lower frequency range.

It is therefore another object of the present invention to provide an improved motor control system which takes into account specific characteristic of the induction motor at the low frequency to thereby assure a consistent motor control over the variable frequency range of the inverter.

Motor current sensing means is utilized in the system to sense zero-crossing points of the motor current so that the power factor phase angle is determined as the phase displacement of the zero-crossing point of the motor current from that of the inverter output voltage. The zero-crossing points of the motor current may be sensed by the use of a current transformer or a Hall-effect device. The current transformer is preferably of a type which becomes saturated over the entire variable frequency range of the inverter so that it produces prominent signals at the zero-crossing points of the motor current which can be easily processed for detection of the zero-crossing points of the motor current. Therefore, a compact current transformer of small capacity is enough to detect the zero-crossing points of the motor current, contributing to the reduction in the size of the device of the control system, which is therefore a further object of the present invention.

The power factor phase angle thus obtained to be indicative of the load imposed is compared with the above frequency dependent reference angle to provide a first control output when the former angle is less than the latter angle and provide a second control output when the former angle is greater than the latter angle. Upon receiving the first or second control output, the volt/frequency (V/F) control section operates to increase or decrease the inverter output voltage out of the predetermined relationship with the selected frequency, thus effecting an automatic torque boost or cut-down in response to the load requirement. For this purpose, the volt/frequency control section is configured to have a plurality of volt/frequency relations, i.e., V/F curves with respect to differing load requirements, each representing a functional relation between the inverter output voltage and the frequency to be applied to the motor. The volt/frequency control section is in operation to designate one of the V/F curves for producing the inverter output voltage determined by the designated V/F curve in the absence of the first or second control output. When first or second control output is issued, the V/F control section responds to select from the plural V/F curves suitable ones having greater or lower inverter output voltages than the designated curve for effecting the above torque boost o cut-down while keeping the frequency substantially unchanged.

It is therefore a further object of the present invention to provides an improved motor control system which is capable of effecting the automatic torque regulation to differing load requirements and therefore capable of being utilized as a general purpose motor control system.

In the present invention, two preferred schemes are utilized for comparison between the frequency dependent reference angle and the detected power factor phase angle. The first scheme involves the use of a latch which produces a high level output each time when the motor current is at an angle of 0° and is reset to produce a low level output each time when the inverter output voltage is at an angle of 0°, such that the power factor phase angle is determined as the duration of the low level output. A reference circuit is included to produce a train of reference pulses each occurring at a timing offset from 0° angle point of the inverter output voltage by an amount which is a function of the inverter frequency and defines the above reference angle. In response to the latch output and the reference pulse, the judge means produces the first control output (i.e., boost signal) when the rising edge of the high level latch output occurs before that of the reference pulse and produces the second control output (i.e., cut-down signal) when the rising edge of the high level latch output occurs after that of the reference pulse, whereby effecting the automatic torque boost or cut-down. The second scheme involves the use of a source of clock signals and a counter counting the clock signals. The counter is enabled to count the clock signals each time when the inverter output voltage is at 0° angle and disabled each time when the motor current is at 0° angle in order to derive the above power factor phase angle as the function of the clock signal counted therebetween. The counter provides an output indicative of thus detected power factor phase angle which is then compared at the judge means with a predetermined reference parameter corresponding to the reference angle so as to determine whether the detected phase angle (i.e., load imposed) is greater or less than the reference angle (i.e., standard load) for the like automatic torque boost and cut-down control.

The above and other objects and advantages of the present invention will become apparent from the following description of the preferred embodiments when taken in conjunction with the attached drawings.

BRIEF DESCRIPTION OF THE EMBODIMENTS

DETAILED DESCRIPTION OF THE EMBODIMENTS

First embodiment <FIGS. 1 to 6>

Figure 1:
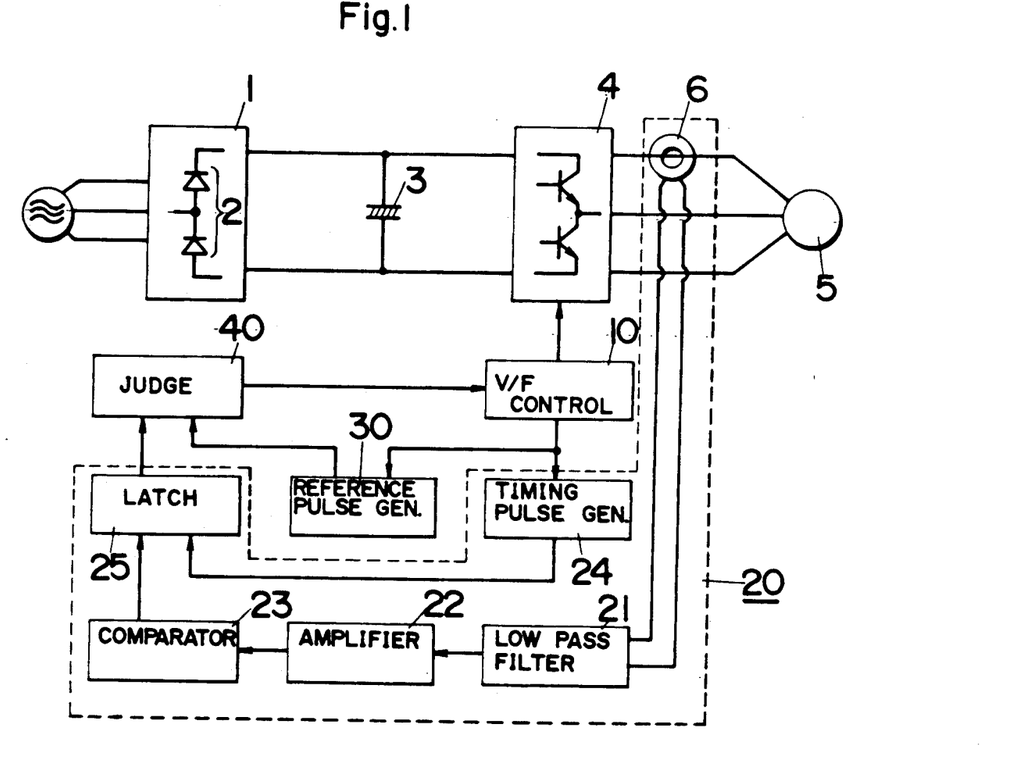
FIG. 1 is a block diagram of a motor control system in accordance with a first embodiment of the present invention.

Referring now to FIG. 1, an induction motor control system in accordance with the first embodiment of the present invention is shown to include an AC-to-DC converter 1 with a rectifier 2 which is coupled to a commercial fixed frequency three-phase AC power source to provide a rectified DC voltage to a DC-to-AC inverter 4 through a smoothing capacitor 3. The inverter 4 comprises three pairs of series connected transistors (only one pair is shown) which are controlled to supply a variable frequency AC voltage to drive a three phase induction motor 5. A volt/frequency control section 10 is coupled to the inverter 4 for control the same on a constant volt/frequency basis. Coupled to one of output lines of the inverter 4 is a current transformer 6 which senses an output current to the motor 5. Thus sensed current or motor current is fed to a power factor detect section 20 where it is processed to provide a power factor phase angle which is indicative of an instantaneous amount of the load imposed on the motor 5. The current transformer 6 is of a type which is connected to a high load resistance and becomes saturated over the entire range of the output frequency of the inverter 4 in order to readily sense zero-crossing points of the motor current. Particularly, the zero-crossing point at 0° angle of the motor current is utilized to be compared at a judge section 40 with a reference angle for determination as to whether the instantaneous load imposed on the motor 5 is greater or less than a standard load level which varies with the frequency.

Figure 2:
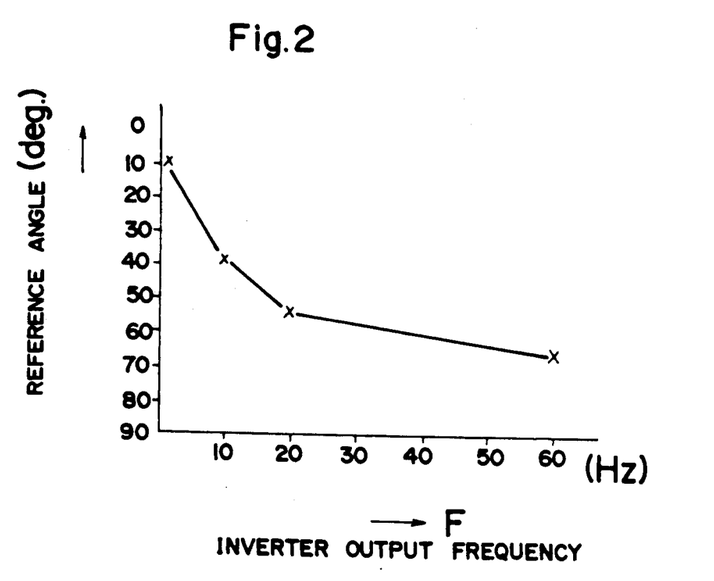
FIG. 2 is a graphical representation of a reference angle illustrated in a generally decreasing relation with decreasing frequency in a lower frequency range.

As shown in FIG. 2, the reference angle is a frequency dependent angle offset from the 0° angle point of the inverter output voltage by an amount which varies with the inverter frequency to be indicative of the above-mentioned standard load level over the variable frequency range of the inverter 4. It should be noted at this point that, as seen from FIG. 2, the characteristic curve of the reference angle is designed to have a greater gradient in the frequency range below 20 Hz than in the frequency range thereabove in order to well compensate for a significant phase shifting of the motor current relative to the inverter output current as typically seen in the low frequency range. A reference pulse 30 is provided to produce a signal representative of such reference angle to the judge section 40 of which output is coupled to the volt/frequency (V/F) section 10 for regulation of the inverter output voltage in accordance with the comparison result at the judge section 40.

Figure 6A:
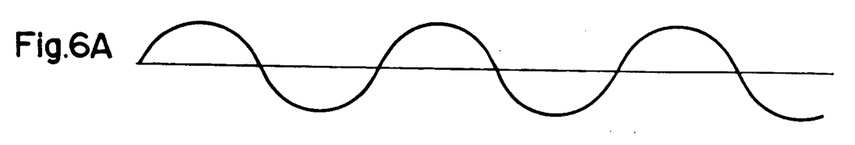
FIG. 6, of FIGS. 6A to 6H, is a time chart illustrating the operation of the motor control system of FIG. 3.
Figure 6B:
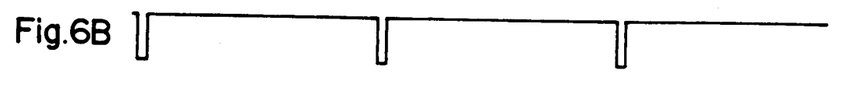
Figure 6C:
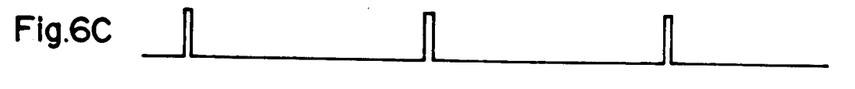
Figure 6D:
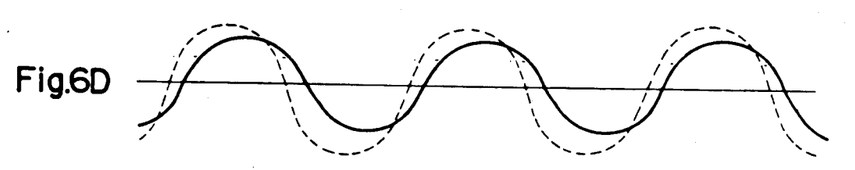
Figure 6E:
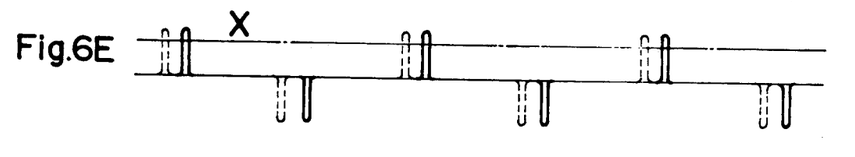
Figure 6F:
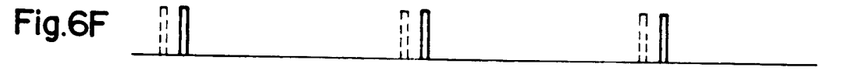
Figure 6G:
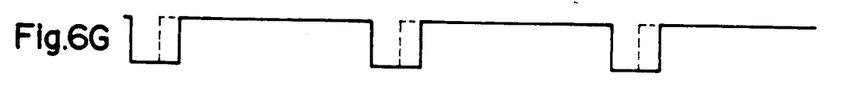
Figure 6H:
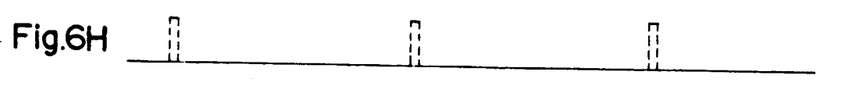

The power factor phase angle detect section 20 includes a low pass filter 21 through which only a fundamental wave component of the motor current detected by the current transformer 6 is allowed to pass to an amplifier 22. That is, the motor current as typically shown in FIG. 6D is processed through the low pass filter 21 and the amplifier 22 to provide a signal of FIG. 6E. The output signal (FIG. 6E) of the amplifier 22 is then fed to a comparator 23 where it is compared with a positive reference level X to provide a square-wave signal as shown in FIG. 6F. Also included in the section 20 is a timing pulse generator 24 which produces a train of in-phase pulses occurring in coincidence with 0° angle point of the inverter output voltage, as shown in FIG. 6B. These signals of FIGS. 6F and 6B respectively output from the comparator 23 and the timing pulse generator 24 are supplied to a latch 25 which is set in response to the pulse (FIG. 6F) from the comparator 23 to produce a high level output and which is reset in response to the timing pulse (FIG. 6B) from the pulse generator 24 to produce a low level output, as shown in FIG. 6G. Thus, the duration of the low level output is detected at the section 20 as corresponding to the power factor phase angle between the motor current and the inverter output voltage. It is noted at this time that the timing pulse or reset pulse is produced in coincidence with 0° angle point of the inverter output voltage for the reason that the zero crossing points of the motor current never lags to that point and thus the reset pulse never interferes with the set pulse (FIG. 6F) resulting from the motor current.

At the judge section 40, the output of the latch 25 is compared with the reference pulse as to provide a boost or out-down signal to the V/F control section 10 for increasing or decreasing the inverter output voltage in accordance with a programmed manner as described hereinafter. That is, when the of rising edge of the high level latch output (FIG. 6G) occurs before that of the reference pulse, the judge section 40 acknowledges that the sensed power factor angle is less than the reference angle at a given frequency to thereby issue the boost signal. When, on the other hand, the rising edge of the high level latch output occurs after that of the reference pulse, the judge section 40 acknowledges that the sensed power factor angle is greater than the reference angle to issue the cut-down signal. For instance, when the motor current lags, as shown by solid lines of FIG. 6D, by the same degree as the reference angle, the rising edge of the high level latch output is in coincidence with that of the reference pulse, issuing no signal to the V/F control section 10 and therefore indicating that the motor is operating at a maximum efficiency in balance with a standard load level at the selected frequency. When the load increases over the standard load level defined by the reference angle, the motor current lags to a further extent, as shown in dotted lines of FIG. 6D, such that the rising edge of the high level latch output occurs in precedence to that of the reference pulse, causing the judge section 40 to issue the boost signal, as shown by dotted line of FIG. 6H, to the V/F control section 10 for increasing the motor torque to catch up the load imposed. On the other hand, when the load decreases below the standard level, the motor current will lead so that phase angle between the motor current and the inverter output voltage becomes greater than the reference angle, the rising edge of the high level latch output occurs after that of the reference pulse, causing the judge section 40 to issue the cut-down signal (although not shown) to the V/F control section 10 for reducing the motor torque for power saving. For stable motor control and the prevention of over-response, there may be provided some degree of dead zone around the timing of the reference pulse in comparing with the rising edge of the high level latch output.

Figure 3:
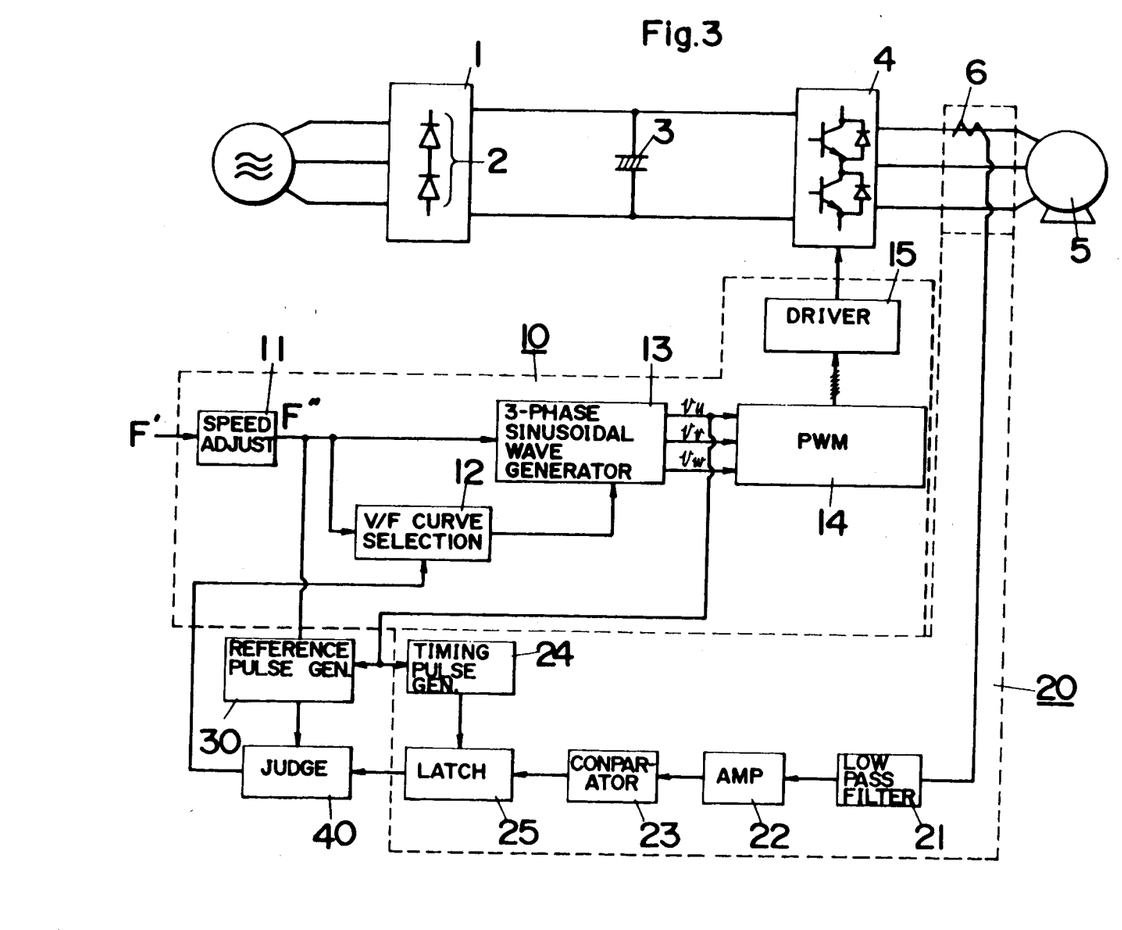
FIG. 3 is a somewhat detailed block diagram of the motor control system of FIG. 1.
Figure 4:
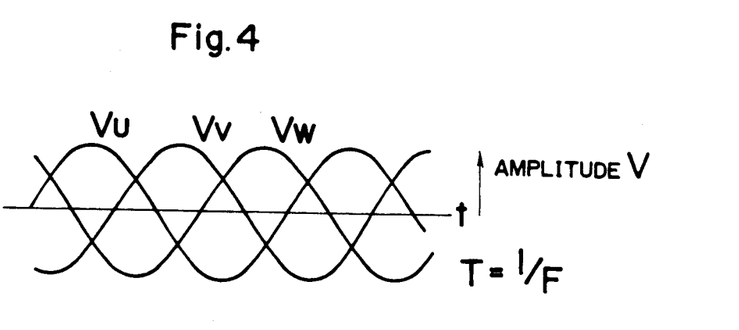
FIG. 4 is a waveform chart illustrating output voltages of a three-phase sinusoidal wave generator utilized in the system of FIG. 3.
Figure 5:
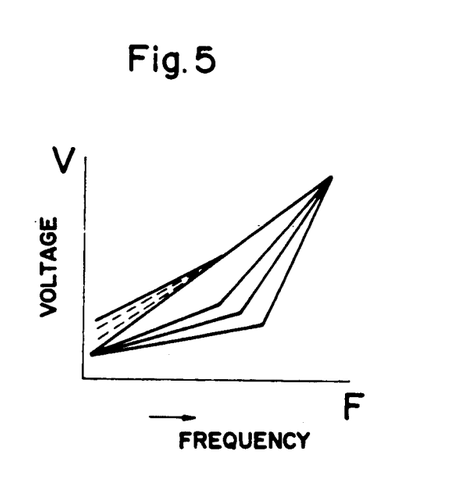
FIG. 5 is a graphical representation of several characteristic V/F curves representing the relation between the inverter output voltage and frequency in use for effecting a constant volt/frequency control.

As shown in FIG. 3, V/F control section 10 includes a speed adjuster 11 which responds to an input frequency F' selected by the user to produce a frequency control signal F" which adjusts an acceleration or deceleration time for the inverter to reach the input frequency F' in accordance with a predetermined program. In response to the frequency control signal F", a V/F curve selection circuit 12 selects a suitable voltage-frequency relation curve as represented by a function V =f(F), where F is the inverter frequency and V is the inverter output voltage, from a plural set of such V/F curves or functions, as schematically shown in FIG. 5, which are predetermined in correspondence with different load requirements and stored in a memory. The V/F curve selection circuit 12 produces a voltage control signal in accordance with the selected V/F curve or function. The voltage control signal is fed together with the frequency control signal F" from the speed adjuster 11 to a three-phase sinusoidal wave generator 13 which responds to produce a trio of sinusoidal wave signals, as shown in FIG. 4, each having the amplitude of V and a cycle of T=1/F. The generator 13 is coupled to a pulse width modulator [PWM] of conventional design where the wave signals Vu, Vv, and Vw from the generator 13 are compared with a reference triangular pulse to provide a pulse width modulated signal which is supplied through a driver 15 for switching the transistor of the inverter 4 in order that the inverter 4 supplies the voltage and frequency determined at the V/F control section 10. It is this V/F curve selection circuit 12 which receives the boost or cut-down signal from the judge section 40 to boost or cut down the inverter output voltage in a stepped manner by changing the V/F curve until the detected amount of the load corresponds to the standard load level.

In operation, the V/F control section 10 utilizes a default V/F curve unless the user select a specific V/F curve for known load conditions. Such manual selection of V/F curve is made at a control panel (not shown) where the selection of the inverter operating frequency is made. In response to the frequency selected, the V/F control section 10 regulates the inverter 4 to produce a suitable voltage defined by the default or designated V/F curve at the given frequency. When the overload condition is recognized as a result of the judge section 40 issuing the boost signal, the V/F control section 10 responds to select another V/F curve which shows a greater voltage level than the designated V/F curve at the given frequency to boost the inverter output voltage by one step. This one-step boosting will continue so long as the boost signal is issued from the judge section 40. Similarly, step-by-step inverter voltage cut-down is effected when the V/F control section 10 receives the cut-down signal from the judge section 40 as indicative of an overpower condition. In this manner, the inverter 4 is automatically controlled to boost or cut down its output voltage by reference to the standard load level which varies with the inverter frequency, whereby driving the motor at an optimum efficiency over the variable frequency range of the inverter. It should be noted at this time that the frequency dependent reference angle is configured to compensate for a significant phase shifting of the motor current due to the increased stator resistive drop as seen in the low frequency range, i.e., below 20 Hz. Therefore, the motor can be operated efficiently even at such low frequency without having such misleading influence.

Figure 7:
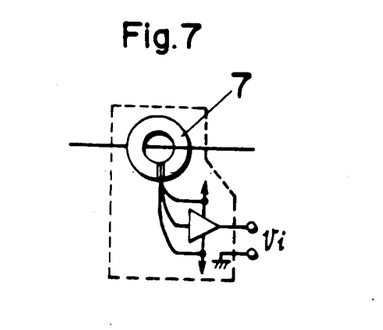
FIG. 7 is a schematic representation of a Hall-effect device shown to be coupled to one phase line to the motor for sensing zero-crossing points of the motor current.

In this embodiment, the current transformer 6, which detects zero-crossing points at 0 degree of the motor current, is of a type saturable over the entire variable frequency range of the inverter, so that the power factor phase angle the motor current can be readily detected in relation to the corresponding zero-crossing point of the inverter output voltage and reliably over the inverter frequency range. However, the present invention is not limited to such current transformer and may utilize a current transformer of general type producing a signal analogous to the motor current. In such case, the detected signal can be suitably processed, e.g., by level discrimination, to represent the zero-crossing points of motor current. Moreover, another current sensor such as utilizing a Hall-effect device 7, as shown in FIG. 7, or shunt resistor may be utilized.

Figure 8:
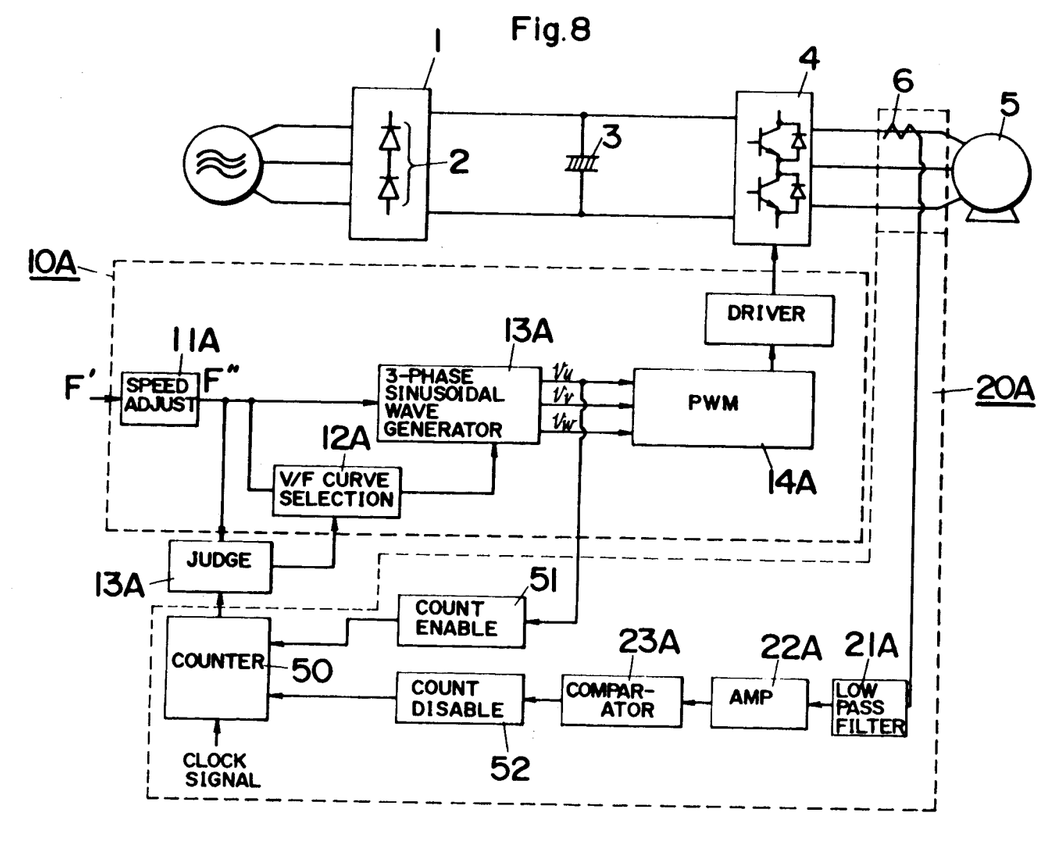
FIG. 8 is a block diagram of a motor control system in accordance with a second embodiment of the present invention.

Second embodiment <FIG. 8>

Figure 9A:
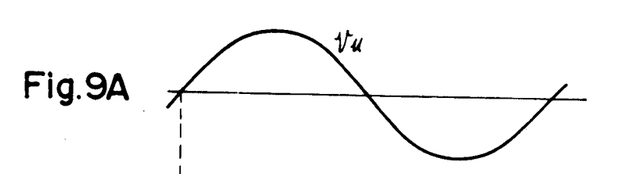
FIG. 9, composed of FIGS. 9A to 9C, is a time chart illustrating the operation of the motor control system of FIG. 8.
Figures 9B, 9C:
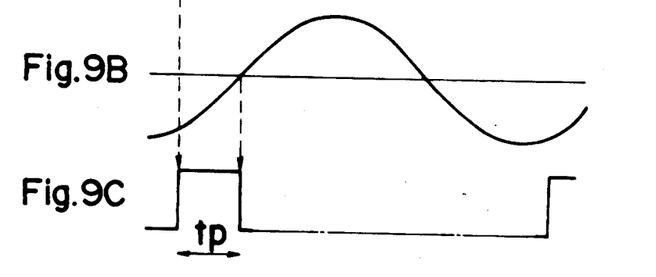

FIG. 8 illustrates a block diagram of a motor control system in accordance with the second embodiment of the present invention which is similar in configuration to the first embodiment except that a counter 50 is utilized to derive the power factor phase angle of the motor current. The like parts are designated by like numerals with the suffix letter of "A". The counter 50 receives from a clock generator (not shown) clock signals and have its inputs coupled to a count enable circuit 51 and a count disable circuit 52. The count enable circuit 51 is operated in synchronism with one of the output, i.e., the output vu of three-phase sinusoidal wave generator 13A so that it enables the counter 50 to count the clock signals each time the output Vu reaches zero-crossing point at 0 degree, as shown in FIG. 9A. The count disable circuit 52 responds to each occurrence of zero-crossing points at 0 degree of the motor current, as shown in FIG. 9B, to disable the counter 50. Thus, the accumulated counts of clock signals in each one cycle of the motor current is well indicative of a phase difference time tp between the motor current and the inverter output voltage. From the phase difference time tp, the power factor phase angle $\phi$ is obtained by the equation $\phi_1 = 2\pi \cdot tp \cdot F$. In this embodiment, the judge section 40A obtains, based upon the frequency control signal from a speed adjuster 11A, a reference power factor angle $\phi_{ref}$ as a function of the inverter frequency. The detected power factor phase angle $\phi_1$ is compared at the judge section 40A with the reference angle $\phi_{ref}$ in order to determine as to whether the detected load is greater or less than the standard load defined by the reference angle $\phi_{ref}$. The comparison result of the judge section 40A is applied to a V/F curve selection circuit 12A for effecting like step-by-step control for boosting or cutting down the motor torque as described in the first embodiment. It may be possible, however, to alter the inverter output voltage in a proportional control basis by deriving the difference between the detected power factor phase angle $\phi_1$ and the reference power factor angle $\phi_{ref}$ where the frequency compensation is primarily required.

What is claimed is:

1. An induction motor control system comprising:
an inverter for supplying a variable frequency AC voltage to drive said induction motor;
volt/frequency control means controlling said inverter to produce a suitable voltage and frequency in a predetermined relationship therebetween;
means for detecting a power factor phase angle between a motor current from said inverter and said inverter output voltage as indicative of an amount of load imposed on the motor;

means for producing a predetermined reference angle;

judge means comparing said detected power factor phase angle with said predetermined reference angle, which is a frequency dependent angle indicative of a standard load at a given frequency, in order to provide a control output in response to which said volt/frequency control section alters said inverter output voltage out of said predetermined relationship with the frequency for improving motor efficiency;

said volt/frequency control means operating to store a plurality of V/F curves, with respect to differing load requirements, each representing a functional relation between said inverter output voltage and the inverter frequency;

said volt/frequency control means operating to designate one of the V/F curves for producing said inverter output voltage determined by said designated V/F curve with respect to a given frequency; and said volt/frequency control means responding to said first and second control outputs respectively to select from said V/F curves at least one curve having greater and lower inverter output voltages than said designated curve with respect to the given frequency for controlling said inverter to supply said greater and lower inverter output voltages while keeping the selected frequency substantially unchanged.

2. An indictor motor control system as set forth in claim 1, wherein said power factor angle detecting means includes a source of clock signals and a counter counting said clock signals;

said counter being enabled to count said clock signals each time when said inverter output voltage is at a 0° angle and being disable each time said motor current is at a 0° angle in order to derive said power factor phase angle as the function of the clock signal counted therebetween;

said counter providing its output indicative of said power factor phase angle to said judge means for comparison with a reference parameter corresponding to said reference angle at said judge means.

3. An induction motor control system comprising:

an inverter for supplying a variable frequency AC voltage to drive said induction motor;

volt/frequency control means controlling said inverter to produce a suitable voltage and frequency in a predetermined relationship therebetween;

motor current sensing means for sensing zero-crossing points of a motor current supplied from said inverter;

means for detecting the phase displacement between the zero-crossing point of said motor current from that of said inverter output voltage to thereby define a power factor phase angle as indicative of an amount of the load imposed on said motor;

means for producing a predetermined reference angle;

judge means comparing said detected power factor phase angle with said predetermined reference angle, which is a frequency dependent angle indicative of a standard load at a given frequency, in order to provide a first control output when the power factor phase angle is less than the predetermined reference angle and provide a second control output when the power factor phase angle is greater than the predetermined reference angle, said first and second control outputs being fed to said volt/frequency control section so as to alter said voltage out of the said predetermined relationship with the frequency for improving motor efficiency;

said volt/frequency control means operating to store a plurality of V/F curves, with respect to differing load requirements, each representing a functional relation between said inverter output voltage and the inverter frequency;

said volt/frequency control means operating to designate one of the V/F curves for producing said inverter output voltage determined by said designated V/F curve with respect to a given frequency; and said volt/frequency control means responding to said first and second control outputs respectively to select from said V/F curves at least one curve having greater and lower inverter output voltages than said designated curve with respect to the given frequency for controlling said inverter to supply said greater and lower inverter output voltages while keeping the selected frequency substantially unchanged.

4. An induction motor control system as set forth in claim 3, wherein said power factor angle detecting means includes a latch which produces a first level output and a second level output to said judge means;

said latch arranged to be set to produce said first level output each time when said motor current is an angle of 0° and to be reset each time when said inverter output voltage is at an angle of 0°, such that said power factor angle detecting means detects said power factor angle as the duration of said second level output;

said judge means including a reference pulse generator which produces a reference pulse occurring at a timing offset from 0° angle of said inverter output voltage by an amount which is determined by the given frequency to be indicative of said reference angle; and said judge means responding to the output of said latch and reference pulse to produce said first control output when said first level latch output appears before said reference pulse and to produce said second control output when said first level latch output appears after said reference pulse.

5. An induction motor control system as set forth in claim 3, wherein said motor current sensing means is a current transformer which becomes saturated over the entire variable frequency range of said inverter.

6. An induction motor control system as set forth in claim 3, wherein said motor current sensing means is a Hall-effect device.

7. An induction motor control system comprising:

an inverter for supplying a variable frequency AC voltage to drive said induction motor;

volt/frequency control means controlling said inverter to produce a suitable voltage and frequency in a predetermined relationship therebetween;

means for detecting a power factor phase angle between a motor current from said inverter and said inverter output voltage as indicative of an amount of load imposed on the motor;

judge means for producing a reference angle which varies in a generally decreasing relation with decreasing frequency in the low frequency range and for comparing said detected power factor phase angle with said predetermined reference angle, which is a frequency dependent angle indicative of a standard load at a given frequency, in order to provide a control output in response to which said volt/frequency control section alters said inverter output voltage out of said predetermined relationship with the frequency for improving motor efficiency.

8. An induction motor control system comprising:

an inverter for supplying a variable frequency AC voltage to drive said induction motor;

volt/frequency control means controlling said inverter to produce a suitable voltage and frequency in a predetermined relationship therebetween;

motor current sensing means for sensing zero-crossing points of a motor current supplied from said inverter;

means for detecting the phase displacement between the zero-crossing point of said motor current from that of said inverter otput voltage to thereby define a power factor phase angle as indicative of an amount of the load imposed on said motor;

judge means for producing a reference angle which varies in a generally decreasing relation with decreasing frequency in the low frequency range and for comparing said detected power factor phase angle with said predetermined reference angle, which is a frequency dependent angle indicative of a standard load at a given frequency, in order to provide a first control output when the power factor phase angle is less than the predetermined reference angle and provide a second control output when the power factor phase angle is greater than the predetermined reference angle, said first and second control outputs being fed to said volt/frequency control section so as to alter said voltage out of the said predetermined relationship with the frequency for improving motor efficiency.

* * * * *